United States Patent
Wang et al.

(10) Patent No.: US 9,372,564 B2
(45) Date of Patent: Jun. 21, 2016

(54) IN-CELL TOUCH PANEL AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Haisheng Wang, Beijing (CN); Xue Dong, Beijing (CN); Lei Wang, Beijing (CN); Shengji Yang, Beijing (CN); Xiaoliang Ding, Beijing (CN); Yingming Liu, Beijing (CN); Weijie Zhao, Beijing (CN); Tao Ren, Beijing (CN); Chunlei Wang, Beijing (CN); Hongjuan Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/344,236

(22) PCT Filed: Sep. 13, 2013

(86) PCT No.: PCT/CN2013/083492
§ 371 (c)(1),
(2) Date: Mar. 11, 2014

(87) PCT Pub. No.: WO2014/166208
PCT Pub. Date: Oct. 16, 2014

(65) Prior Publication Data
US 2014/0306916 A1    Oct. 16, 2014

(30) Foreign Application Priority Data

Apr. 10, 2013    (CN) .......................... 2013 1 0123613

(51) Int. Cl.
*G06F 3/041*    (2006.01)
(52) U.S. Cl.
CPC ...................................... *G06F 3/041* (2013.01)
(58) Field of Classification Search
CPC .................... G06F 3/0412; G06F 2203/04103
See application file for complete search history.

(56) References Cited

U.S. PATENT DOCUMENTS 8,279,197 B2    10/2012  Murphy et al.
2005/0073505 A1*  4/2005  Katsuki ................ G06F 3/0436
                                                                    345/173

(Continued)

FOREIGN PATENT DOCUMENTS

CN    102221945 A    10/2011
CN    102566838 A    7/2012

(Continued)

OTHER PUBLICATIONS

International Seach Report Issued Dec. 17, 2013; Appln. No. PCT/CN2013-083492.

(Continued)

*Primary Examiner* — Claire X Pappas
*Assistant Examiner* — Robert Stone
(74) *Attorney, Agent, or Firm* — Ladas & Parry LLP (57) ABSTRACT

Embodiments of the present invention provide an in-cell touch panel and a display device to decrease the influence of the touch driving electrode in the in-cell touch panel on image display. The in-cell touch panel includes an upper substrate and a lower substrate opposite to each other, and includes a plurality of touch sensing electrodes provided on the upper substrate and a plurality of touch driving electrodes provided on the lower substrate, wherein the touch sensing electrodes are laterally distributed, and the touch driving electrodes are longitudinally distributed; wherein the touch sensing electrodes include one or a plurality of touch sensing sub-electrodes which are parallel to each other and distributed laterally, and the plurality of touch sensing sub-electrodes are in parallel connection therebetween.

14 Claims, 11 Drawing Sheets

(56) References Cited

U.S. PATENT DOCUMENTS

| | | | |
|---|---|---|---|
| 2008/0062148 A1* | 3/2008 | Hotelling | G02F 1/13338 345/174 |
| 2008/0252608 A1* | 10/2008 | Geaghan | 345/173 |
| 2008/0309627 A1* | 12/2008 | Hotelling | G02F 1/134363 345/173 |
| 2009/0315840 A1* | 12/2009 | Park | G02F 1/13338 345/173 |
| 2010/0194699 A1* | 8/2010 | Chang | G06F 3/044 345/173 |
| 2010/0214262 A1* | 8/2010 | Ishizaki | G02F 1/13338 345/174 |
| 2010/0309162 A1* | 12/2010 | Nakanishi et al. | 345/174 |
| 2011/0050617 A1* | 3/2011 | Murphy | G06F 3/0418 345/174 |
| 2011/0242027 A1* | 10/2011 | Chang | 345/173 |
| 2012/0044171 A1* | 2/2012 | Lee et al. | 345/173 |
| 2012/0105337 A1* | 5/2012 | Jun | G06F 3/0412 345/173 |
| 2012/0113027 A1* | 5/2012 | Song | G06F 3/0412 345/173 |
| 2012/0274603 A1* | 11/2012 | Kim et al. | 345/174 |
| 2012/0306797 A1* | 12/2012 | Misaki | 345/173 |
| 2013/0257774 A1* | 10/2013 | Kim et al. | 345/173 |
| 2013/0265282 A1* | 10/2013 | Nakagawa | G06F 3/044 345/174 |
| 2013/0342801 A1* | 12/2013 | Hamada | G06F 3/0412 349/141 |
| 2014/0118299 A1* | 5/2014 | Wang | G06F 3/0416 345/174 |

FOREIGN PATENT DOCUMENTS

| | | |
|---|---|---|
| CN | 102937845 A | 2/2013 |
| CN | 103092424 A | 5/2013 |
| CN | 103226412 A | 7/2013 |
| CN | 203054788 U | 7/2013 |
| CN | 203178977 U | 9/2013 |
| JP | 2010039515 A | 2/2010 |

OTHER PUBLICATIONS

First Chinese Office Action dated Jul. 2, 2015; Appln. No. 201310123613.X.

International Preliminary Report on Patentability issued Oct. 13, 2015; PCT/CN2013/083492.

Second Chinese Office Action dated Dec. 2, 2015; Appln. No. 201310123513.X.

* cited by examiner

IN-CELL TOUCH PANEL AND DISPLAY DEVICE

TECHNICAL FIELD

Embodiments of the present invention relate to an in-cell touch panel and a display device.

BACKGROUND

Touch panels (TP) comprise an add-on touch panel and an in-cell touch panel.

The in-cell touch panel is a touch display device with a simple structure, high display performances and low cost. The touch driving electrodes and the touch sensing electrodes of the touch panel are integrated in a display screen to enhance product competence. The in-cell touch panel currently has been the mainstream in the display field.

In the prior art, touch and display functions are achieved through providing the touch driving electrodes and the touch sensing electrodes on the color filter substrate and the array substrate of a display panel.

Figure 1:
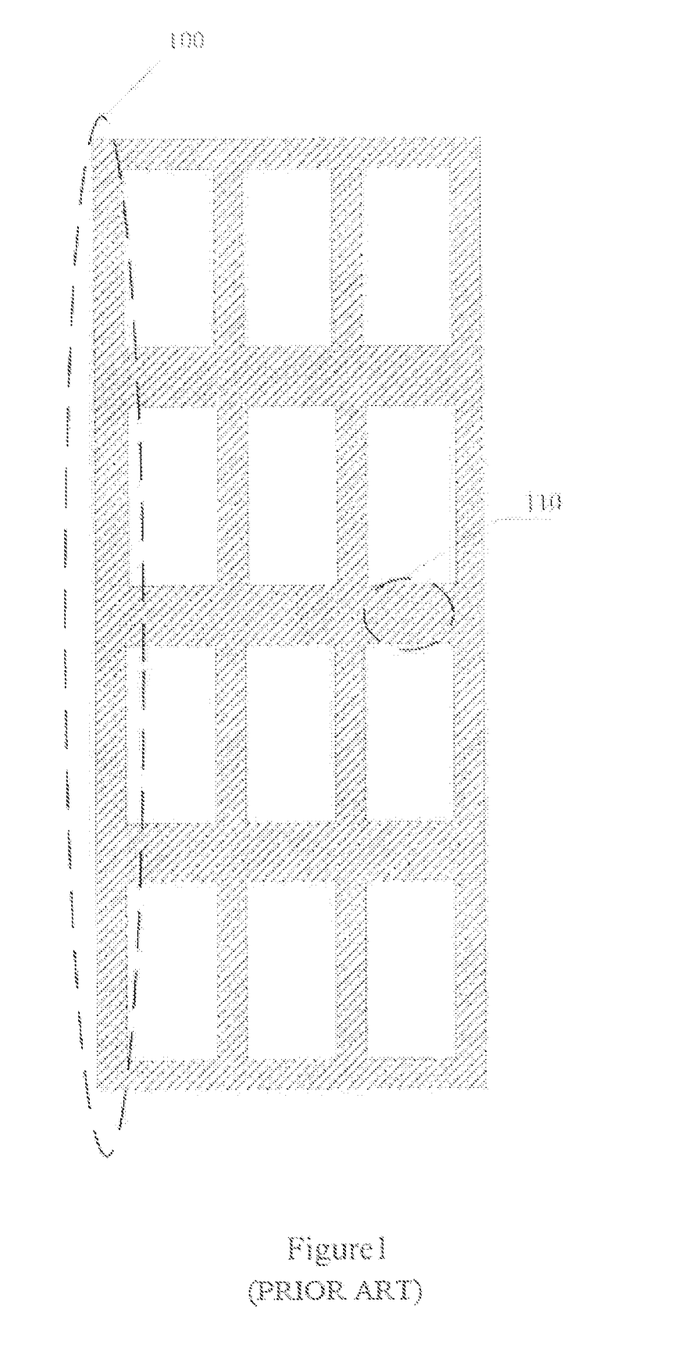
FIG. 1 is a schematic diagram of the structure of the touch sensing electrode of an existing in-cell touch panel.

In current in-cell touch panel solutions, the touch sensing electrodes are provided to be in a mesh shape, as shown in FIG. 1. FIG. 1 is a schematic diagram of the structure of an existing touch driving electrode or touch sensing electrode. The touch sensing electrode comprises a plurality of first sub-electrodes 100 located within a black matrix area and distributed longitudinally and a plurality of second sub-electrodes 110 located in the black matrix area and distributed laterally, and the second sub-electrodes 110 are in electrical connection with the first sub-electrodes 100, and they constitute a mesh-shaped electrode structure. In the mesh-shaped electrode structure shown in FIG. 1, the longitudinally distrusted first sub-electrodes 100 easily form an electric filed with the common electrode on the array substrate, thus the image display effect of the in-cell touch panel is affected.

SUMMARY

Embodiments of the present invention provide an in-cell touch panel and a display device to decrease the influence of the touch driving electrode in the in-cell touch panel on image display.

The in-cell touch panel provided by the embodiments of the present invention comprises an upper substrate and a lower substrate opposite to each other, and comprises a plurality of touch sensing electrodes provided on the upper substrate and a plurality of touch driving electrodes provided on the lower substrate, and the touch sensing electrodes are laterally distributed, and the touch driving electrodes are longitudinally distributed.

The touch sensing electrodes comprise one or a plurality of touch sensing sub-electrodes which are parallel to each other and distributed laterally, and the plurality of touch sensing sub-electrodes are in parallel connection therebetween.

For example, the lower substrate comprises a plurality of laterally distributed gate lines, and the touch sensing sub-electrodes are located in an area corresponding to the gate lines.

For example, the touch driving electrodes comprise a plurality of touch driving sub-electrodes which are in series connection therebetween.

For example, the plurality of touch driving sub-electrodes of the touch driving electrodes are in series connection therebetween through a lead located in a peripheral area.

For example, the lower substrate further comprises a plurality of pixel electrodes which are located at a different layer with respect to the touch driving electrodes, the plurality of touch driving sub-electrodes of the touch driving electrodes are in series connection therebetween through a connection line provided at the same layer with the pixel electrodes, and the connection line is located in a non-display area between two adjacent columns of pixel electrodes.

For example, the lower substrate comprises a common electrode comprising a first common electrode and a second common electrode;

The first common electrode is the time-sharing driven touch driving electrode, and the second common electrode is an electrode between two adjacent rows of the touch driving sub-electrodes.

For example, the lower substrate further comprises a common electrode line connected with the first common electrode and the second common electrode.

For example, the projection of the touch sensing electrodes on the lower substrate is located within the area where the second common electrode is located.

For example, the distance between the projection of the touch sensing electrodes on the lower substrate and the touch driving sub-electrodes is 3-7 µm.

The embodiment of the present invention provides a display device comprising the above touch panel.

In the embodiments of the present invention, the touch sensing electrodes are provided on the upper substrate, the touch sensing electrodes are constituted by at least one laterally distributed touch sensing sub-electrode, and the identical ends of the touch sensing sub-electrodes in each touch sensing electrode are in electrical connection with each other. The touch driving electrodes are provided on the array substrate and distributed longitudinally. A touch function that does not affect image display is achieved through respectively applying a voltage to the touch driving electrodes and the touch sensing electrodes.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terms or scientific terms used herein should be the general meanings understood by one having ordinary skills in the field of the present invention. The terms "first", "second" and similar terms used in the description and claims of this patent application do not represent any order, amount or importance, and just aim to differentiate different parts. Likewise, similar terms such as "one" or "a" do not represent limitation on amount while refer to at least one. Similar terms such as "including" or "comprising" refer to that an element or article preceding the terms "including" or "comprising" covers the elements, articles and equivalents thereof listed after the terms "including" or "comprising", and do not exclude other elements or articles. Similar terms such as "connect" or "couple" are not limited to physical or mechanical connections, and can comprise electrical connection, no matter direct or indirect. Terms such as "upper", "lower", "left" and "right" are only intended to represent relative position relationships, when the absolute position of a described object is changed, the relative position relationships may be changed correspondingly.

The embodiments of the present invention provide an in-cell touch panel and a display device to decrease the influence of the touch sensing electrodes in the in-cell touch panel on image display.

In the embodiments of the present invention, a plurality of touch sensing electrodes are provided on the upper substrate (assembling substrate), each touch sensing electrode is constituted by one touch sensing sub-electrode or by at least two (that is, a plurality of) touch sensing sub-electrodes which are laterally distributed and parallel to each other, and the plurality of touch sensing sub-electrodes which are laterally distributed and parallel to each other are in parallel connection therebetween.

In the embodiments of the present invention, a plurality of touch driving electrodes can be provided on the lower substrate (array substrate), and present a longitudinal (that is, the direction perpendicular to the touch sensing electrodes) distribution perpendicular to the touch sensing electrodes. A touch function that does not affect image display is achieved through respectively applying a voltage to the touch driving electrodes and the touch sensing electrodes.

The in-cell touch panel provided by the embodiments of the present invention can be integrated in a liquid crystal display panel in a TN mode or a liquid crystal display panel in an FFS (Fringe-Field Switching) mode, or a liquid crystal display panel in an ADS (Advanced Super Dimension Switch) mode.

The in-cell touch panel provided by the embodiments of the present invention will be detailed hereinafter in combination with the drawings.

In the drawings the thicknesses and shapes of the various films do not reflect the true ratios of the in-cell touch panel and the display device, which are just intended to schematically describe the technical solutions of the present invention.

Figure 2:
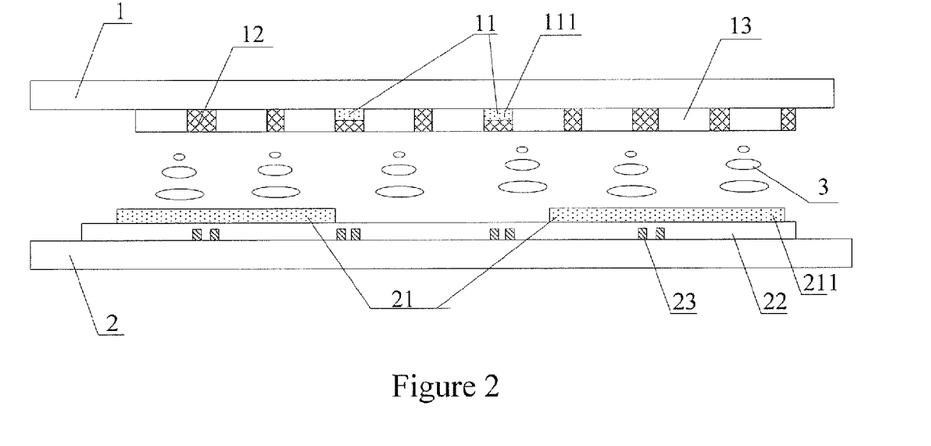
FIG. 2 is a schematic diagram of the section of the in-cell touch panel provided by the embodiment of the present invention.

Referring to FIG. 2, it is a section view of the in-cell touch panel in the longitudinal direction provided by the embodiments of the present invention.

The in-cell touch panel comprises: an upper substrate 1 and a lower substrate 2 opposite to each other; a liquid crystal layer 3 between the upper substrate 1 and the lower substrate 2; a plurality of touch sensing electrodes 11 provided at the side of the upper substrate 1 close to the liquid crystal layer 3; and a plurality of touch driving electrodes 21 provided at the side of the lower substrate 2 close to the liquid crystal layer 3.

The touch sensing electrodes 11 are laterally distributed, and the touch driving electrodes 21 are longitudinally distributed.

The touch sensing electrodes 11 comprise one laterally distributed touch sensing sub-electrode 111, or at least two (that is, a plurality of) touch sensing sub-electrodes 111 which are parallel to each other and distributed laterally, and the touch sensing sub-electrodes 111 which are parallel to each other and distributed laterally are in parallel connection therebetween (not shown in FIG. 2).

The lateral direction and the longitudinal direction cross with each other, that is, perpendicular to each other.

The touch panel shown in FIG. 2 only shows one touch sensing electrode 11 and one touch driving electrode 21. The one touch sensing electrode 11 is constituted by two touch sensing sub-electrodes 111, and the one touch driving electrode 21 is constituted by two touch driving sub-electrodes 211.

The touch driving electrodes provided by the embodiments of the present invention can be strip-shaped electrodes having no pattern and can also be strip-shaped electrodes constituted by a plurality of touch driving sub-electrodes. The touch driving electrode 21 shown in FIG. 2 is constituted by two touch driving sub-electrodes 211 which are distributed longitudinally and are in series connection therebetween.

The touch sensing electrodes and the touch driving electrodes provided by the embodiments of the present invention will be detailed described hereinafter.

Figure 3:
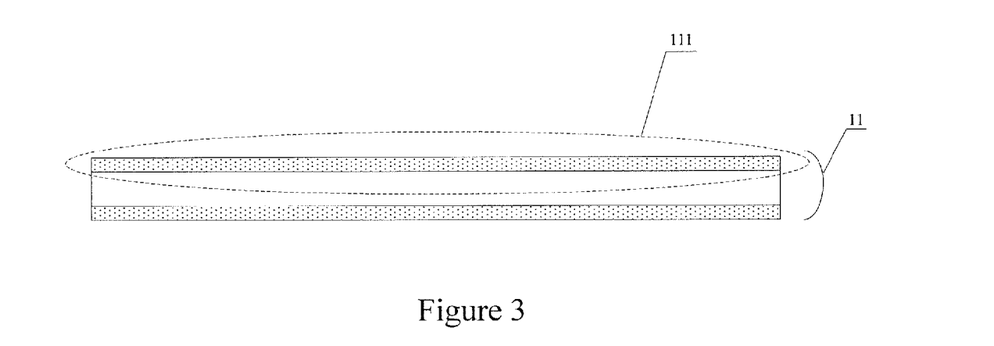
FIG. 3 is a schematic diagram of the structure of the touch sensing electrode provided by the embodiment of the present invention.

To more clearly describe the structure of the touch sensing electrode 11 shown in FIG. 2, description will be made hereinafter referring to FIG. 3. FIG. 3 is a top view of the touch sensing electrode 11. The touch sensing electrode 11 comprises a plurality of touch sensing sub-electrodes 111 (as shown by the structure in the closed dotted box in FIG. 3), and the touch sensing sub-electrodes 111 are distributed laterally, and are parallel to each other and in parallel connection therebetween. The touch sensing electrode 11 shown in FIG. 3 is constituted by two touch sensing sub-electrodes 111 in parallel connection.

The touch sensing electrode 11 provided by the embodiments of the present invention only comprises the touch sensing sub-electrodes 111 which are laterally distributed and parallel to each other, and does not comprise longitudinally distributed touch sensing sub-electrodes, thus the influence of the touch sensing electrodes on display can be effectively decreased.

As shown in FIG. 2, the in-cell touch panel provided by the embodiments of the present invention further comprises: a black matrix 12 which is distributed as an array and located between the color display areas 13 on the upper substrate 1. In order not to affect the light transmittance of the color display areas 13, the touch sensing electrodes 11 provided by the embodiments of the present invention are located in the area of the substrate 1 corresponding to the black matrix 12. Specifically, the touch sensing sub-electrodes 111 are located in the area of the substrate 1 corresponding to the black matrix 12.

The touch sensing electrodes 11 provided by the embodiments of the present invention can be located between, but not limited to, the upper substrate 1 and the black matrix 12, or can be located at, but not limited to, the side (that is, not limited to the side close to the liquid crystal layer 3) of the black matrix 12 distal from the upper substrate 1.

Figure 4:
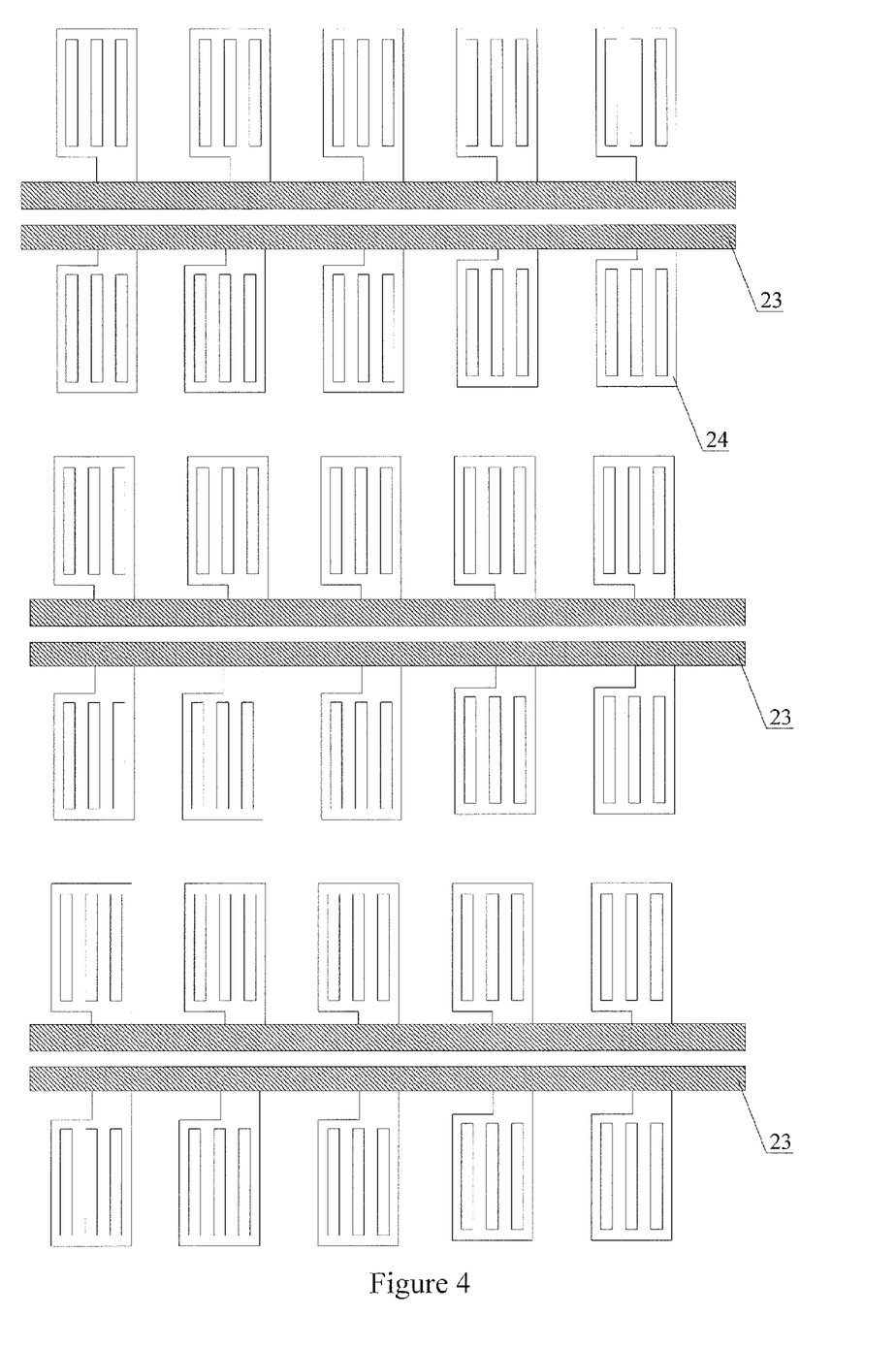
FIG. 4 is a schematic diagram of the pixel structure provided by the embodiments of the present invention.

Referring to FIG. 2, the in-cell touch panel provided by the embodiments of the present invention further comprises a plurality of gate lines 23 located on the lower substrate 2 and distributed laterally, and two gate lines are provided between two adjacent rows of sub-pixel units. FIG. 4 is a schematic diagram of the pixel structure of the plurality of gate lines 23 and the plurality of pixel electrodes 24 provided on the lower substrate 2 as shown in FIG. 2. The gate lines 23 are provided in pair between the display areas corresponding to two adjacent rows of pixel electrodes 24, the upper row of the two gate lines 23 corresponds to the upper row of the pixel electrode, and the lower row of the gate lines corresponds to the lower row of the pixel electrodes. Referring to FIG. 2, the gate lines 23 are located between the lower substrate 2 and the touch driving electrodes 21, and are insulated from the touch driving electrodes 21 through an insulating layer 22.

Compared with the existing pixel structure that one gate line is provided between the display areas corresponding to two adjacent rows of pixel electrodes, in the pixel structure provided by the embodiments of the present invention, the longitudinal width of the non-display area where the gate lines are located increases. The longitudinal widths of the non-display areas where the gate lines are located in different sizes of display panels can be different, and the longitudinal width of the non-display area where the gate lines is located in a medium-sized display panel can be up to 20 μm. The longitudinal width of the non-display area where the gate lines is located in a large-sized display panel can be larger.

Figure 5:
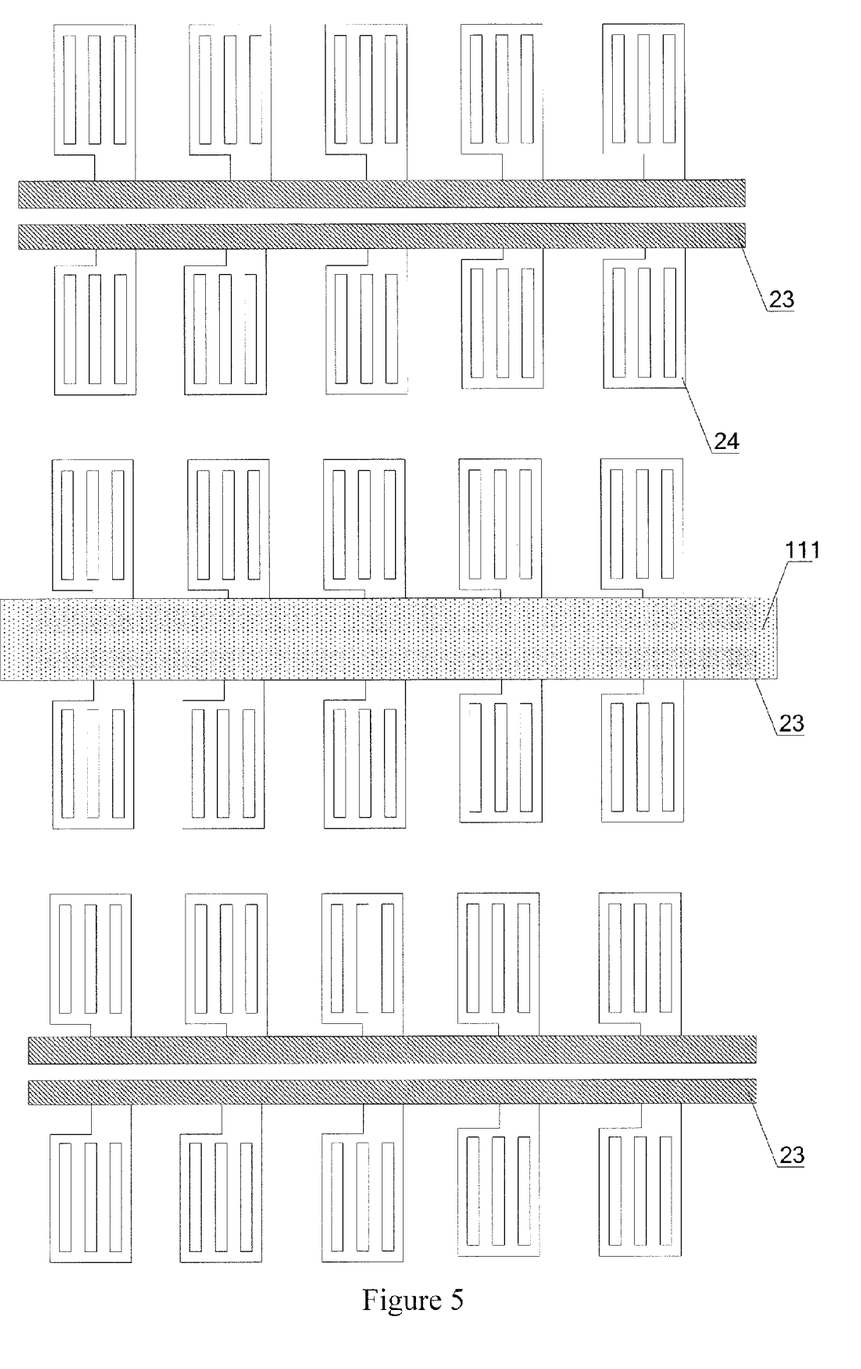
FIG. 5 is a schematic diagram of the relative position structure of the touch sensing electrodes and the pixel structure provided by the embodiments of the present invention.

For example, referring to FIG. 5, the touch sensing electrodes 11 provided by the embodiments of the present invention are located in the black matrix area corresponding to the gate lines 23 shown in FIG. 4. Each touch sensing sub-electrode 111 corresponds to two gate lines 23 between two adjacent rows of pixel electrodes 24. Therefore, each touch sensing sub-electrode 111 is relatively wide.

The touch sensing electrode shown in FIG. 5 is an amplified view of the touch sensing electrode 11 shown in FIG. 3.

In the present invention, the touch sensing electrodes 11 are provided in the black matrix area corresponding to the gate lines 23 on the lower substrate 2, thus the longitudinal width of the touch sensing electrodes 11 can be increased, that is, the longitudinal width of the touch sensing sub-electrodes 111 in the black matrix area is increased. Compared with the existing touch sensing sub-electrode provided in the black matrix area with a width of about 6 μm corresponding to the data line, the touch sensing sub-electrodes provided in the present invention can be provided in the black matrix area with a width of about 20 μm, thus the width of the touch sensing sub-electrodes 111 is increased, and then the influence of the touch sensing electrodes 11 on the display can be effectively decreased.

The touch driving electrodes provided by the embodiments of the present invention will be described hereinafter.

Figure 6:
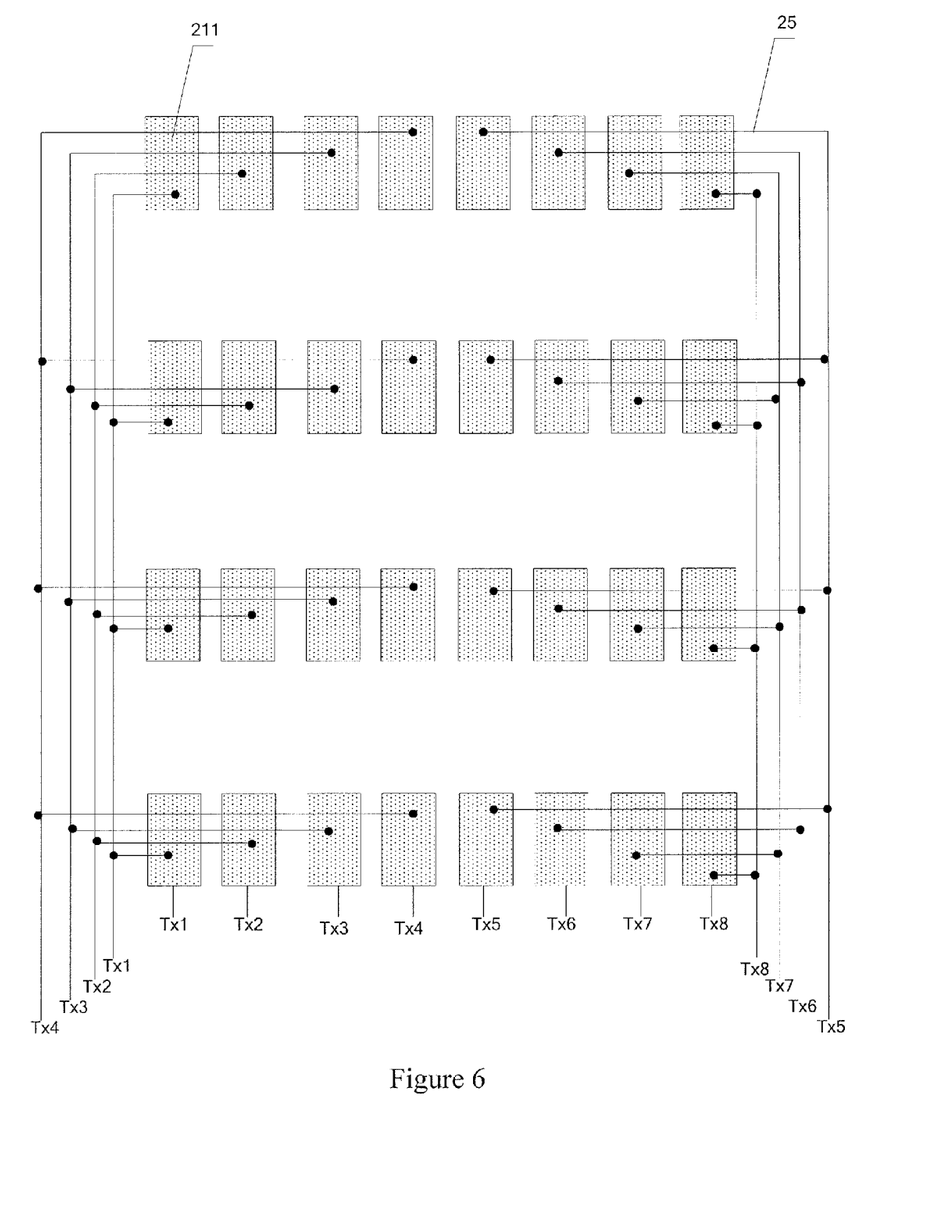
FIG. 6 is a first schematic diagram of the structure of the touch driving electrodes provided by the embodiment of the present invention, which can also be changed to a bilateral drive manner.

Referring to FIG. 6, the plurality of touch driving electrodes provided by the embodiments of the present invention are constituted by a plurality of touch driving sub-electrodes, the touch driving electrodes are respectively Tx1, Tx2, Tx3, Tx4, Tx5, Tx6, Tx7 and Tx8, and are located on the lower substrate 2 and distributed longitudinally.

Referring to FIG. 6, each touch driving electrode is constituted by four touch driving sub-electrodes 211 in the same column which are in series connection through the same lead. For example, they are in series connection through the lead 25. An end of the lead 25 is the input end of a touch driving signal, and an end of the touch driving sub-electrodes 211 in the last row is the output end of the touch driving signal.

Referring to FIG. 6, the touch driving sub-electrodes 211 of each touch driving electrode are in series connection through a lead corresponding to the peripheral area in the lower substrate, for example, the lead 25.

The leads 25 can be located at one side or two sides of the peripheral area of the lower substrate. Among the eight touch driving electrodes shown in FIG. 6, the first four (Tx1-Tx4) are located at one side of the peripheral area in the lower substrate, and the remaining four (Tx5-Tx8) are located at the other side of the peripheral area in the lower substrate, thus, mutual insulation between the leads can be ensured, and the yield of the products can be improved.

The drive manner of the touch driving electrodes shown in FIG. 6 is unilateral drive, and can also be a bilateral drive manner.

Figure 7:
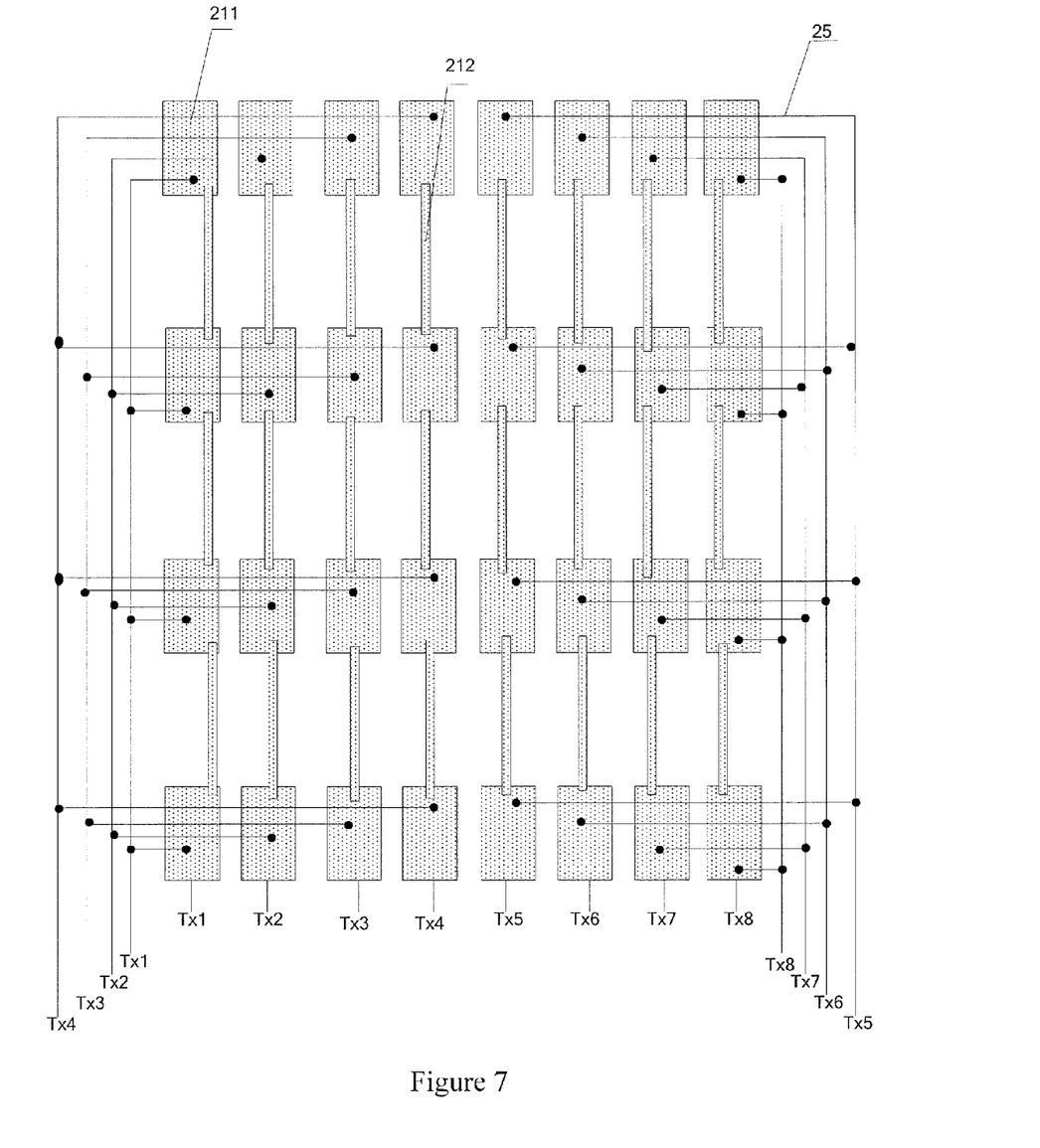
FIG. 7 is a second schematic diagram of the structure of the touch driving electrodes provided by the embodiment of the present invention.

To enhance the longitudinal conduction of each touch driving electrode and achieve a stable touch driving signal, the touch driving sub-electrodes 211 of each touch driving electrode provided by the embodiments of the present invention are in series connection through a connection line 212 in a display area of a display panel, referring to FIG. 7. The connection line 212 is located in the area corresponding to the longitudinally arranged data lines (FIG. 7 does not show any data line), and the connection line 212 is located at a different layer with respect to the touch driving electrodes and is connected with the touch driving sub-electrodes through a via hole. The connection line 212 and the pixel electrodes can be provided at the same layer.

The touch driving electrodes and the pixel electrodes provided by the embodiments of the present invention are located at different layers, and the pixel electrodes can be located above or below the touch driving electrodes. When the pixel electrodes are provided above the touch driving electrodes, the touch driving electrodes present a slit-shaped structure, and when the pixel electrodes are provided below the touch driving electrodes, the touch driving electrodes present a plate-shaped structure.

Hereinafter the slit-shaped pixel electrodes are taken as an example to describe the relative position of the slit-shaped pixel electrodes and the connection line 212.

Figure 8:
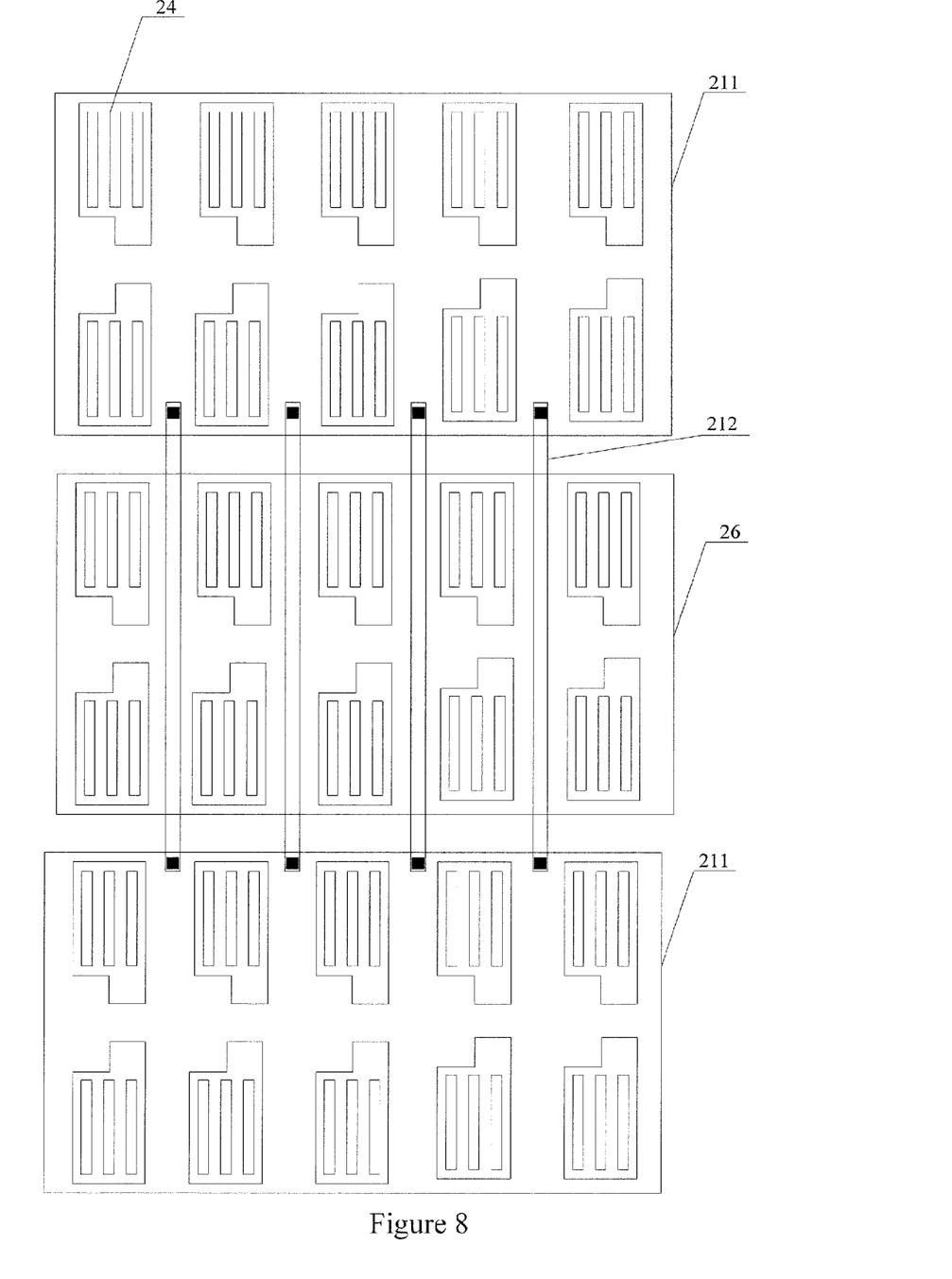
FIG. 8 is a section view of the in-cell touch panel comprising the pixel electrodes and the connection line provided by the embodiment of the present invention.

Referring to FIG. 8, two adjacent rows of pixel electrodes 24 are provided opposite to each other, and the touch driving sub-electrodes 211 cover the two adjacent rows of pixel electrodes 24. The common electrode 26 is located between two adjacent touch driving sub-electrodes 211, the connection line 212 goes across the common electrode 26 and is connected with two adjacent touch driving sub-electrodes 211.

The pixel electrodes 24 are provided at the same layer with the connection line 212, and connected with the touch driving sub-electrodes 211 below the common electrode 26 through a via hole.

During implementation, the connection line 212 and the pixel electrodes 24 are formed through a one-time composition process, and no new processes are added.

Figure 9:
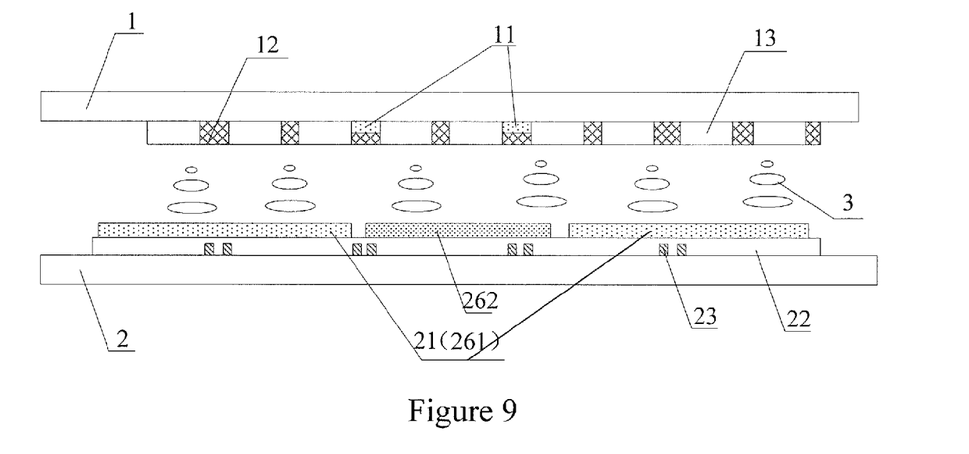
FIG. 9 is a section view of the in-cell touch panel comprising the common electrode provided by the embodiment of the present invention.

More preferably, referring to FIG. 9, the embodiments of the present invention further provide common electrodes which are located on the lower substrate 2 and provided at the same layer with the touch driving electrodes 21. The common electrodes comprise two parts, and the first part includes a plurality of time-sharing driven first common electrodes 261, the second part includes a plurality of second common electrodes 262, and the common electrode 26 covers the whole lower substrate 2.

Figure 10:
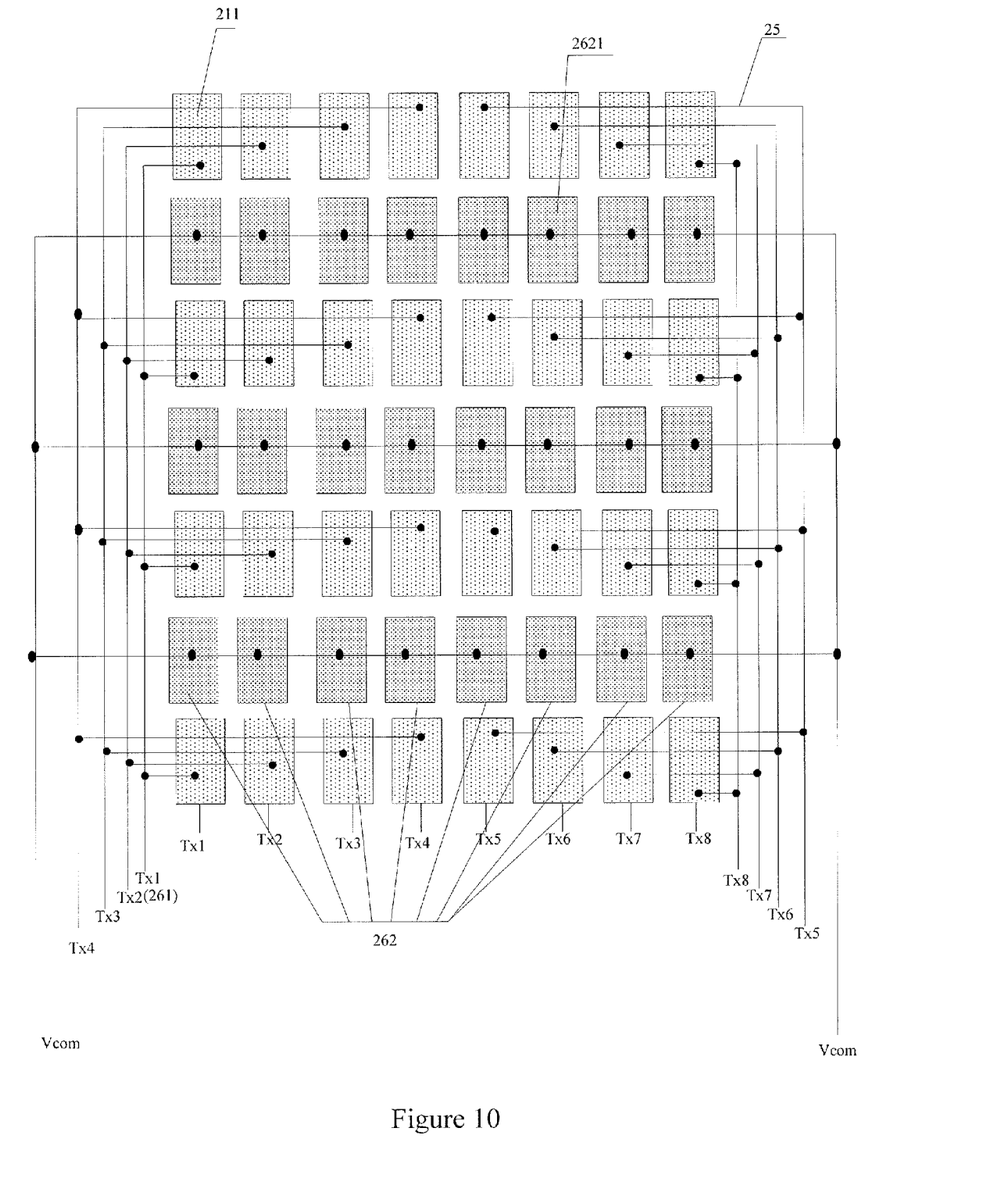
FIG. 10 is a top view of the in-cell touch panel comprising the common electrode provided by the embodiment of the present invention.

FIG. 10 is a top view of the common electrode shown in FIG. 9. As shown in FIG. 10, the touch driving electrodes constituted by the touch driving sub-electrodes 211 serve as the first common electrodes 261 shown in FIG. 9 at an image display phase; the second common electrodes 262 are a plurality of electrodes between respective two adjacent rows of touch driving sub-electrodes 211. Each of the second common electrodes 262 comprises a plurality of common sub-electrodes 2621. The common sub-electrodes 2621 in the same row are connected through one wire. All the common sub-electrodes 2621 are connected through a common electrode line (Vcom line) in the peripheral area.

The wire connecting the same row of common sub-electrodes 2621 and the common sub-electrodes 2621 can be located at the same layer or at different layers. When the wire and the common sub-electrodes 2621 are located at different layers, they can be connected with each other through a via hole.

The touch driving electrodes and the common electrode provided by the embodiments of the present invention are located at the same layer. During specific implementation, the whole layer of conductive film is divided into a plurality of sub-electrodes (comprising the common sub-electrodes and the touch driving sub-electrodes) arranged to be a matrix. At a display phase, all the sub-electrodes are used as the common electrodes to achieve image display; at a touch phase, the touch driving sub-electrodes are used to achieve a touch function. Optionally, the second common electrodes can be a strip-shaped electrode, the wire connecting the common sub-electrodes need not be provided, and the second common electrodes can be directly connected with the common electrode line in the peripheral area.

Figure 11:
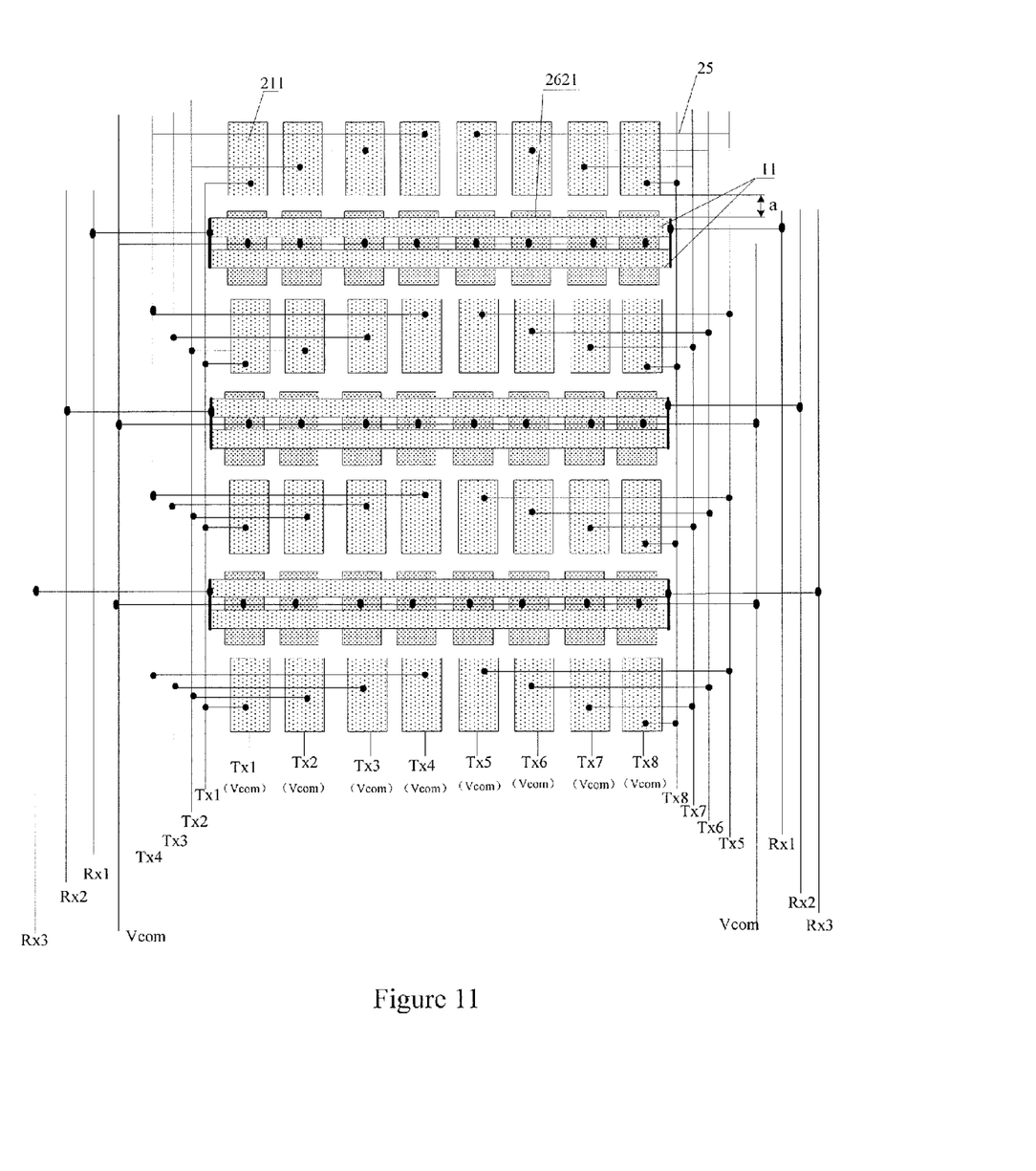
FIG. 11 is a top view of the in-cell touch panel comprising the common electrode and the touch sensing electrodes provided by the embodiment of the present invention.

More preferably, as shown in FIG. 11, the perpendicular projection of the laterally arranged touch sensing electrodes 11 provided by the embodiments of the present invention on the lower substrate 2 is within the second common electrodes. FIG. 11 shows three touch sensing electrodes 11 being Rx1, Rx2 and Rx3 respectively, which are connected with a corresponding chip or drive circuit through the leads in the peripheral area.

The small black points in FIGS. 6, 7, 8, 10 and 11 represent electrical connection.

More preferably, to lower the resistance of all the common electrodes, the common electrode line below the common electrodes is used to provide a Vcom signal to the common electrodes or to provide a touch driving signal to the first common electrodes of the common electrodes. The common electrode line is connected with the common electrodes through a via hole.

More preferably, to ensure a large rate of change of the touch of the touch driving electrode Tx and the touch of the touch sensing electrode Rx, the touch driving electrode and the touch sensing electrode are provided to have no perpendicular overlapping plane therebetween.

More preferably, as shown in FIG. 11, the distance a between the touch sensing electrode 11 and the touch driving sub-electrodes 211 is 3-7 μm.

More preferably, the width (that is, the lateral width of the touch driving sub-electrodes) of the longitudinally arranged touch driving electrodes is about 5 mm, and the longitudinal width of the touch driving sub-electrodes is about 5 mm.

More preferably, the distance between two adjacent touch driving sub-electrodes belonging to the same touch driving electrode is 5 mm.

The numbers and size of the common electrode Vcom and the drive electrodes are not limited to the numbers and the size shown in the drawings and can be adjusted according to actual situations.

The touch driving electrodes and the touch sensing electrodes provided by the embodiments of the present invention are formed of a transparent metal oxide conductive film.

Generally speaking, at the display phase of one frame of image, the first 12.7 ms is used for LCD display during which time the Vcom electrode provides a Vcom signal; the last 4 ms of the display phase of the one frame of image is used for detecting the touch driving signal, during which time the Vcom electrode provides the touch driving signal. As the touch driving electrodes and the touch sensing electrodes completely cover the LCD gate lines and data lines (or gate electrode or source/drain electrode S/D), if the manner of time-sharing driving the Touch and the LCD is not used, the signal received by the touch sensing electrodes will be interfered by the signal from the LCD, thus the present invention uses the time-sharing drive manner.

Figure 12:
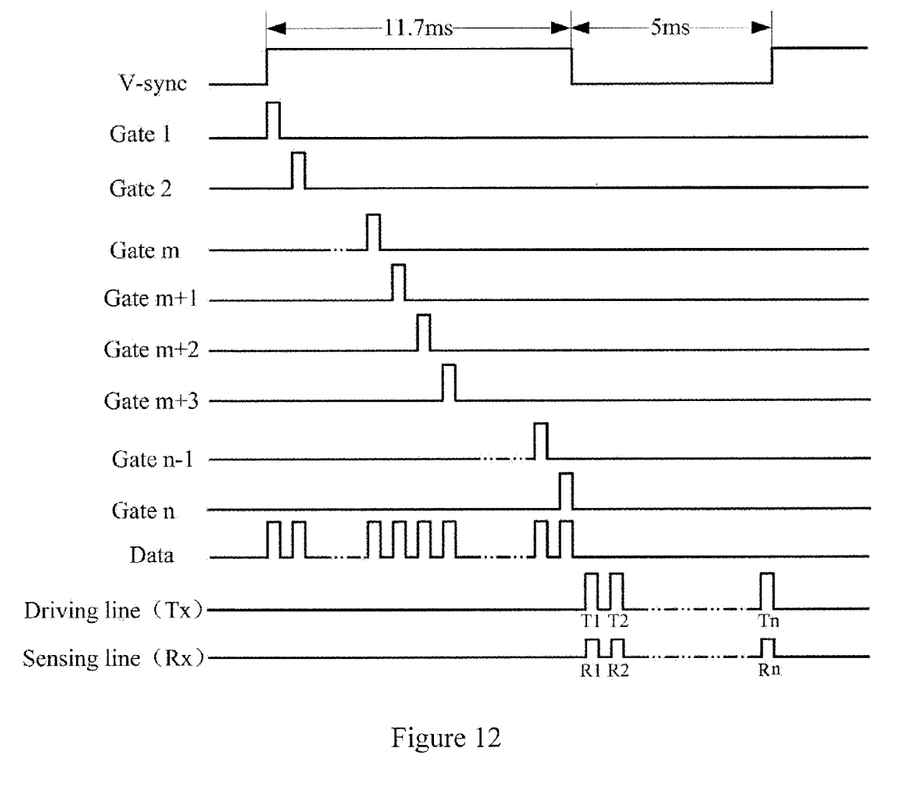
FIG. 12 is a time sequence diagram of the in-cell touch panel provided by the embodiments of the present invention when achieving the touch function.

FIG. 12 is a time sequence diagram when the present invention achieves image display and the touch function, and the working principle of the in-cell touch panel provided by the embodiments of the present invention is detailed described hereinafter.

In FIG. 12, Vsync is a time sequence signal. The drawing shows the time sequences of n gate lines, and the n gate lines are respectively gate line 1 (Gate 1), gate line 2 (Gate 2), . . . , gate line m (Gate m), gate line m+1 (Gate m+1), gate line m+2 (Gate m+2), gate line m+3 (Gate m+3), gate line n−1 (Gate n−1), gate line n (Gate n). The drawing also shows the time sequence of the data line (Data), the time sequence of the n touch driving electrodes (T1, T2, . . . , Tn), and the time sequence of the n touch sensing electrodes (R1, R2, Rn).

In FIG. 12, during the first 11.7 ms of one frame of image, a gate voltage is sequentially applied to the n gate lines, and a data signal is sequentially applied to the data lines at the same time. In addition, a certain constant voltage is applied to the common electrodes (comprising the touch driving electrodes) shown in FIG. 11 to achieve image display.

During the last 5 ms of the one frame of image, a low level signal is applied to the gate lines and the data lines so that the TFT connected with the gate lines is switched off. Also, a certain touch driving voltage V1 is sequentially applied to the common electrodes (touch driving electrodes), and a constant voltage V0 is applied to the touch sensing electrodes at the same time. An electric field is formed between the touch sensing electrodes to which the voltage V0 is applied and the touch driving electrodes to which the voltage V1 is applied, and then the touch function is achieved.

The 11.7 ms of the above image display phase and the 5 ms of the touch display phase are just intended to describe an example of the present invention, and during specific implementation, the image display phase is not limited to 11.7 ms, and the touch display phase is not limited to 5 ms, either.

The embodiment of the present invention also provide a display device comprising the above in-cell touch panel, and the display device can be a liquid crystal display, a liquid crystal television, an OLED panel, an OLED display, an OLED television, an electronic paper or etc.

The embodiment of the present invention provide an in-cell touch panel, wherein, the touch sensing electrodes are provided on a color filter substrate, the touch sensing electrodes are constituted by one or a plurality of touch sensing sub-electrodes parallel to one another, and the touch sensing sub-electrodes in each touch sensing electrode are in parallel connection with each other. The touch driving electrodes are provided on the array substrate and distributed longitudinally. A touch function that does not affect image display is achieved through respectively applying a voltage to the touch driving electrodes and the touch sensing electrodes.

The embodiments of the invention are thus described, and it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An in-cell touch panel, comprising an upper substrate and a lower substrate opposite to each other, wherein the upper substrate is provided with a plurality of touch sensing electrodes, the lower substrate is provided with a plurality of touch driving electrodes, and the touch sensing electrodes are laterally distributed, and the touch driving electrodes are longitudinally distributed;
   wherein each of the touch sensing electrodes comprise one or a plurality of touch sensing sub-electrodes which are parallel to each other and distributed laterally, and the plurality of touch sensing sub-electrodes are in parallel connection therebetween
   wherein the touch driving electrodes comprise a plurality of longitudinally distributed touch driving sub-electrodes which are in series connection therebetween,
   wherein the lower substrate further comprises a plurality of pixel electrodes which are located at a different layer with respect to the touch driving electrodes, the plurality of touch driving sub-electrodes of the touch driving electrodes are in series connection with each other through a connection line provided at the same layer with the pixel electrodes, and the connection line is located in a non-display area between two adjacent columns of pixel electrodes.

2. The touch panel according to claim 1, wherein the lower substrate comprises a plurality of laterally distributed gate lines, and the touch sensing sub-electrodes are located in an area corresponding to the gate lines.

3. The touch panel according to claim 1, wherein the plurality of touch driving sub-electrodes of the touch driving electrodes are in series connection therebetween through a lead located in a peripheral area.

4. The touch panel according to claim 3, wherein the lower substrate further comprises a plurality of pixel electrodes which are located at a different layer with respect to the touch driving electrodes, the plurality of touch driving sub-electrodes of the touch driving electrodes are in series connection with each other through a connection line provided at the same layer with the pixel electrodes, and the connection line is located in a non-display area between two adjacent columns of pixel electrodes.

5. The touch panel according to claim 3, wherein the lower substrate comprises common electrodes, each of the common electrodes comprises a first common electrode and a second common electrode; and
   the first common electrode is a time-sharing driven touch driving electrode, and the second common electrode is an electrode between two adjacent rows of the touch driving sub-electrodes.

6. A display device comprising the touch panel according to claim 1.

7. The touch panel according to claim 1, wherein the lower substrate comprises common electrodes, each of the common electrodes comprises a first common electrode and a second common electrode; and
   the first common electrode is a time-sharing driven touch driving electrode, and the second common electrode is an electrode between two adjacent rows of the touch driving sub-electrodes.

8. The touch panel according to claim 7, wherein the lower substrate further comprises a common electrode line connected with the first common electrode and the second common electrode.

9. The touch panel according to claim 7 wherein the projection of the touch sensing electrodes on the lower substrate is located within the area where the second common electrode is located.

10. The touch panel according to claim 9, wherein the distance between the projection of the touch sensing electrodes on the lower substrate and the touch driving sub-electrodes is 34 μm.

11. An in-cell touch panel, comprising an upper substrate and a lower substrate opposite to each other, wherein the upper substrate is provided with a plurality of touch sensing electrodes, the lower substrate is provided with a plurality of touch driving electrodes, and the touch sensing electrodes are laterally distributed, and the touch driving electrodes are longitudinally distributed;
   wherein each of the touch sensing electrodes comprise one or a plurality of touch sensing sub-electrodes which are parallel to each other and distributed laterally, and the plurality of touch sensing sub-electrodes are in parallel connection therebetween
   wherein the touch driving electrodes comprise a plurality of longitudinally distributed touch driving sub-electrodes which are in series connection therebetween,
   wherein the lower substrate comprises common electrodes, each of the common electrodes comprises a first common electrode and a second common electrode; and
   the first common electrode is a time-sharing driven touch driving electrode, and the second common electrode is an electrode between two adjacent rows of the touch driving sub-electrodes.

12. The touch panel according to claim 11, wherein the lower substrate further comprises a common electrode line connected with the first common electrode and the second common electrode.

13. The touch panel according to claim 11 wherein the projection of the touch sensing electrodes on the lower substrate is located within the area where the second common electrode is located.

14. The touch panel according to claim 13, wherein the distance between the projection of the touch sensing electrodes on the lower substrate and the touch driving sub-electrodes is 3-7 μm.

* * * * *